W. S. OSBORNE.
METHOD OF DESICCATING LIQUID SUBSTANCES.
APPLICATION FILED FEB. 24, 1909.
1,007,599.
Patented Oct. 31, 1911.
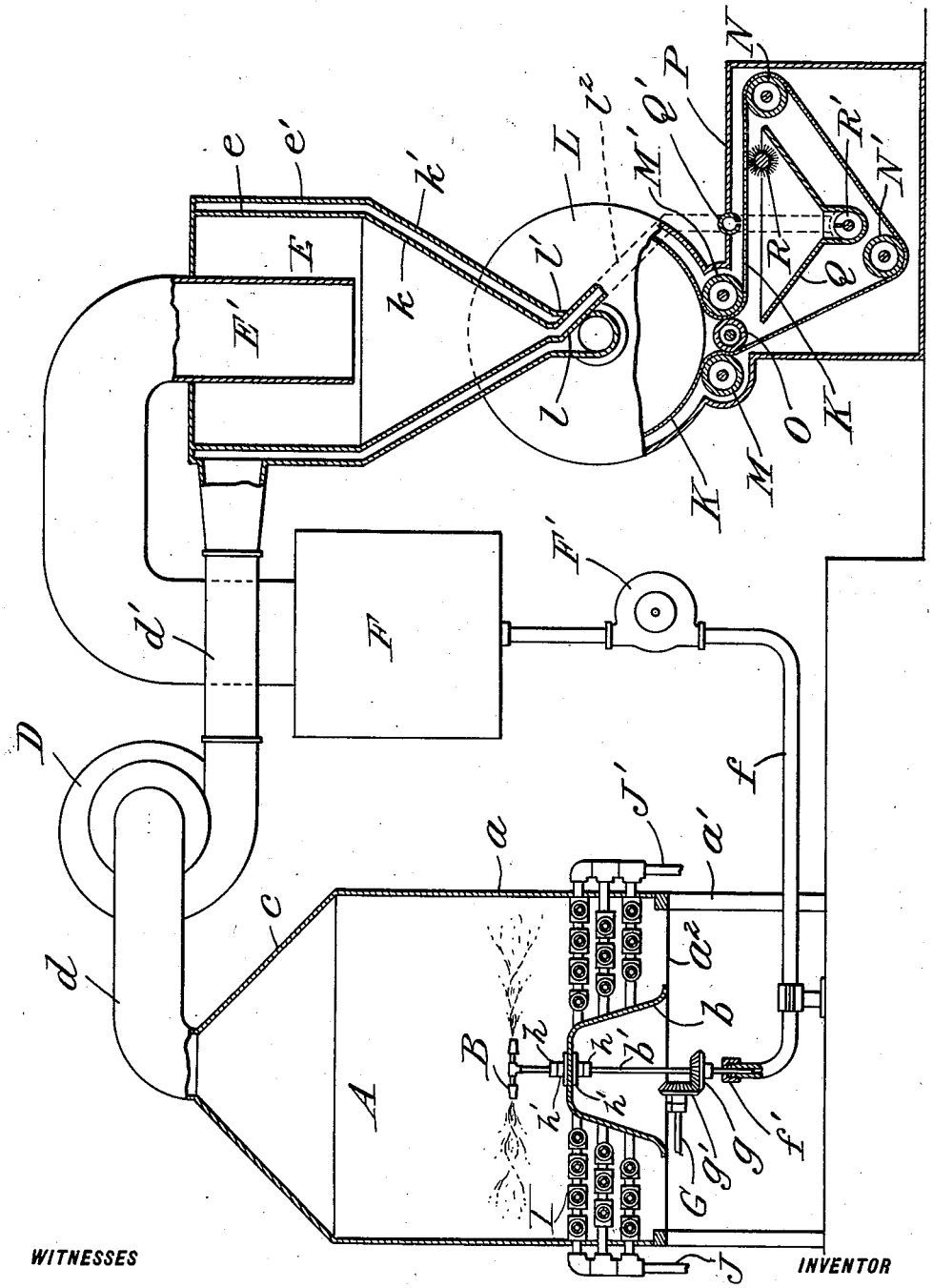
WITNESSES
INVENTOR
William S. Osborne
BY
ATTORNEYS

UNITED STATES PATENT OFFICE.

WILLIAM SILAS OSBORNE, OF NEW YORK, N. Y., ASSIGNOR, BY DIRECT AND MESNE ASSIGNMENTS, TO OSBORNE DESICCATING MACHINERY COMPANY, A CORPORATION OF NEW YORK.

METHOD OF DESICCATING LIQUID SUBSTANCES.

1,007,599.        Specification of Letters Patent.      Patented Oct. 31, 1911.

Original application filed August 24, 1908, Serial No. 450,105. Divided and this application filed February 24, 1909. Serial No. 479,819.

*To all whom it may concern:*

Be it known that I, WILLIAM S. OSBORNE, a citizen of the United States, residing in the city of New York, borough of Manhattan, county and State of New York, have invented a certain new and useful Method of Desiccating Liquid Substances, of which the following is a specification.

This invention appertains to the art of desiccating and collecting solids from liquid substances or semiliquids generally, and more particularly from liquid food substances, such as milk or milk products.

The invention of this application is a division of a prior application filed by me on August 24, 1908, Serial No. 450,105.

According to this invention, the substance to be treated is changed from a state of liquid to an atomized condition, and while such substance is suspended in a finely divided mechanical state, it is treated by exposure to a current of air which acts to thoroughly desiccate the substance while at the same time conveying it to other machinery wherein the desiccated product is separated from the air and collected in appropriate receivers with practically no loss of the product.

Prior to this invention it has been proposed to desiccate liquid substances by atomizing the same within a chamber through which air is adapted to circulate, and to subsequently separate the desiccated matter from the air. In such prior methods of treatment, however, the atomizing and desiccating operations were carried on under such conditions that the liquid atoms subsequent to atomization were brought into such proximity to each other that a certain percentage of such atoms were free to re-unite, thus resulting in a free liquid which must either be returned to the apparatus and again atomized, or be lost in the process.

The purposes of this invention are twofold, first, to distribute the liquid within a closed chamber and under such conditions that the liquid atoms cannot re-unite, and to supply atmospheric air, preferably heated to the required temperature, in such volumes directly to the zone of sprayed liquid under treatment as to carry off the liquid from the zone of distribution as fast as it is delivered into said chamber. The effect of these operations is to, practically, envelop each atom of liquid under treatment by air, which not only precludes reunion of such atoms, but tends to thoroughly desiccate the same, for the reason that the air, particularly when heated, will absorb the moisture from the liquid, resulting in a substantially impalpable powder.

In the drawings, the figure represents a form of apparatus suitable for carrying out my process, the latter being shown partly in elevation and partly in vertical section.

A casing, $a$, forms a desiccating chamber, A, within which the liquid material to be treated is distributed by a suitable rotary distributer, B. Casing, $a$, is supported, in a raised position, on a suitable stand or frame, $a'$, and the bottom of said casing is open at $a^2$ for the free ingress of air into chamber, A. Extending upwardly within chamber, A, is a dome, $b$, through which passes a supply pipe, $b'$, adapted to feed liquid material to sprayer, B, as will presently appear. A tapering or conical top, $c$, substantially closes the upper part of casing, $a$, and to this top is connected one branch, $d$, of a wind trunk, the other branch, $d'$, of which trunk connects with an exterior casing, $e$, of the pneumatic separating and collecting apparatus, E. Intermediate branches, $d, d'$, of said wind trunk is a fan or blower, D, the same being of any suitable construction and operated by any suitable means, whereby a draft of air is caused to circulate through desiccating chamber, A, for the purpose of carrying with it the desiccated material, and such blast is delivered into the separating and collecting apparatus, E.

The material to be treated is contained within a tank, F, the same being supported preferably in a position above the horizontal plane of rotary distributer, B, although said tank may be located at any other convenient place, in which event the liquid material may be forced by a pump to the spraying device. As shown, supply tank, F, is connected by a pipe, $f$, with feed pipe, $b'$, of the rotary distributer, and in said pipe, $f$, is interposed a pumping mechanism, F', herein shown as a rotary pump, although any other type of pump may be employed, whereby the liquid material may be forced under pressure to the rotary distributer. Feed pipe, $b'$, is coupled rigidly to the rotary distributer head for rotation therewith, and the lower part of rotatable feed pipe, b', extends within an end portion of supply pipe, f, a suitable stuffing box, f', being provided at the point where pipes b', f, meet each other to preclude leakage of liquid material at such point. As shown, feed tube b', is provided with a bevel gear, g, with which meshes a complemental gear, g', on a driving shaft, G, the latter being propelled by any suitable means. It is evident that the shaft, G, and the gearing, g, g', will rotate pipe, b', and rotary distributer, B. Pipe, b', extends through the closed upper part of dome, b, which extends upwardly from the lower part of bottomless casing, a, and said pipe is supported by any suitable means in the dome, b, as for example, by collars, h, which are made fast with said pipe, b', said collars engaging with a bearing block, h', fastened to the dome, b. It is evident, however, that the details of the means for supporting pipe, b', and rotary distributer, B, may be modified by a skilled constructor.

Rotary distributer, B, is supported within desiccating chamber, A, directly over dome, b, and said rotary distributer is adapted to rotate in a horizontal plane for the purpose of discharging the liquid material in a substantially radial direction and in a practically continuous manner within chamber, A, the fine particles of liquid being discharged directly into the path of an upwardly moving current of air, the latter being induced to circulate through chamber, A, by the action of blower or fan, D. The diameter of rotary distributer, B, is much less than the internal diameter of desiccating chamber, A, whereby the liquid material may be distributed in a substantially horizontal plane without coming in contact with the internal surfaces or walls of casing, *a*.

The manner of distributing the liquid material, and of supplying a large volume of air to the zone of distribution, constitutes an important feature of this invention, for the reasons, first, that the particles of liquid material are separated from each other and enveloped by the inflowing air so as to preclude the possibility of the liquid particles re-uniting with each other; second, the distributed liquid is instantly and continuously carried off from the zone of liquid distribution by the inflowing current of air, thus further precluding the reunion of the liquid particles, and, third, the particles of liquid material which are suspended mechanically and in a finely divided state in the air are desiccated and dried by the action of the air thereon, particularly when air is heated to a certain temperature.

Any suitable means may be employed for heating the air prior to, or at the time of, its admission into the desiccating chamber, and in the drawing there is illustrated a practical form of air heating apparatus. As shown, the space between casing, *a*, at the lower part thereof, and dome, *b*, is substantially filled by heating coils or pipes arranged in rows, as indicated at I, said rows of pipes being slightly separated and disposed in staggered order so that the inflowing air will impinge the device and absorb heat therefrom, whereby the air as it passes upwardly into desiccating chamber, A, will be heated to a temperature proper for absorbing the moisture from the distributed liquid material. A suitable heating medium, such as live steam, is adapted to be supplied to pipes or coils, I, of the heater by pipe, J, connected to one side of the coils, and to the other side of said coils or pipes there is connected an off bearing pipe, J', adapted to carry away the exhaust steam and water of condensation.

The separating and collecting apparatus indicated generally by the reference character, E, is constructed substantially as disclosed in a prior application filed July 10, 1908, Serial No. 442,874, entitled "Pneumatic separating apparatus." As shown, branch, *d'*, of the wind trunk is adapted to deliver the current of air, laden with the material to be separated, tangentially into casing, *e*, whereby a whirling motion is imparted to the current for causing it to act in a manner familiar with dust collectors, and to effect a separation of the solid matter or dust from the air current. Casing E, is surrounded by an outer jacket, *e'* which communicates, as usual, with the casing, and said casing and the jacket are provided with substantially conical bottoms, *k*, *k'*, respectively, which bottoms terminate in concentric discharge outlets, *l*, *l'*.

From the separator a portion of the desiccated material passes directly to a filtering apparatus by which said desiccated matter is completely separated from the air. Said filtering apparatus comprises an endless belt, K, composed of filtering material. The outlet *l*, from separator, E, is adapted to discharge by a pipe through one end of casing, L, the latter containing a shaft and substantially circular heads, upon which heads the filtering fabric, K, is mounted. Said fabric is distended into a generally cylindrical form, and it is positioned in such relation to casing, L, and outlet, that the fine desiccated material from the separator will be delivered into the space inclosed by said filtering fabric.

To remove the desiccated material from chamber, L, and to keep the interstices of the fabric free and open, means are employed for continuously moving said filtering fabric into and from said chamber, and for cleansing said fabric without interrupting the filtering operation. Rolls, M, M', are journaled in the lower part of casing, L, so as to bear closely against the outer surfaces of filtering fabric, K, and between said rolls is a third roll, O. The group of rolls are so arranged that the fabric passes upward between rolls, M, O, being closely pressed between them, and after clearing the heads within chamber, L, said fabric passes downward between rolls, O, M'. From roll, M', the fabric passes to a roll, N, journaled in casing, P, thence to a similar roll, N', and thence up to rolls, M, O, and back to filtering chamber, L. Motion is imparted to the rolls and to fabric, K, by any suitable means, and all the desiccated material, falling freely to the bottom of chamber, L, is carried by the motion of the fabric downward between rolls, O, M', and falls into a hopper, Q. The material is loosened from the fabric by a blast of air delivered from pipe, Q', and by the action of a rotary brush, R. For removing the material from hopper, Q, a screw conveyer, R', is located in the bottom portion of said hopper, and to this conveyer is discharged the fine desiccated material which is separated by precipitation in the centrifugal separator, said material being delivered through outlet, $l'$, and carried by a tube, $l^2$, to said conveyer, R'.

From the centrifugal separator, E, leads a wind trunk, E', adapted to convey any fine desiccated material back to feed tank, F.

Having thus fully described the invention, what I claim as new, and desire to secure by Letters Patent is:

1. The method of desiccating liquid or semiliquid substances, which consists in circulating a current of air in an upward direction through a substantially closed chamber, feeding the substance to be treated into the chamber substantially centrally thereof, distributing the substance radially within the chamber and directly into the air flowing therethrough, whereby the distributed substance is caught up by the flowing air and desiccated by the action thereof, and finally carrying the resulting product out of the chamber by the air current flowing therethrough.

2. The method of desiccating liquid or semiliquid substances, which consists in circulating a current of air in an upward direction through a substantially closed chamber, feeding the substance to be treated into the chamber substantially centrally thereof, showering the substance by a rotary motion directly into the air flowing through the chamber, whereby the liquid particles are caught up by the flowing air without coming into contact with the surfaces of the chamber, and carrying the resulting desiccated product out of the chamber by the air flowing therethrough.

3. The method of desiccating liquid or semiliquid substances, which consists in circulating a current of air in an upward direction through a substantially closed chamber, heating the air as it enters said chamber by causing it to flow into contact with a hot surface at the bottom of said chamber, feeding the substance to be treated in an upward direction through the bottom of the chamber and substantially centrally thereof, showering the substance by a rotary motion directly into the air flowing through the chamber, whereby the liquid particles are distributed in all directions from a central point in the chamber and said liquid particles are caught up by the flowing air, and carrying the resulting desiccated product out of the chamber by the air flowing therethrough.

In testimony whereof I have signed my name to this specification in the presence of two subscribing witnesses.

WILLIAM SILAS OSBORNE.

Witnesses:
H. I. BERNHARD,
M. C. POWELL.